Sept. 13, 1955        K. BOSSARD        2,717,989

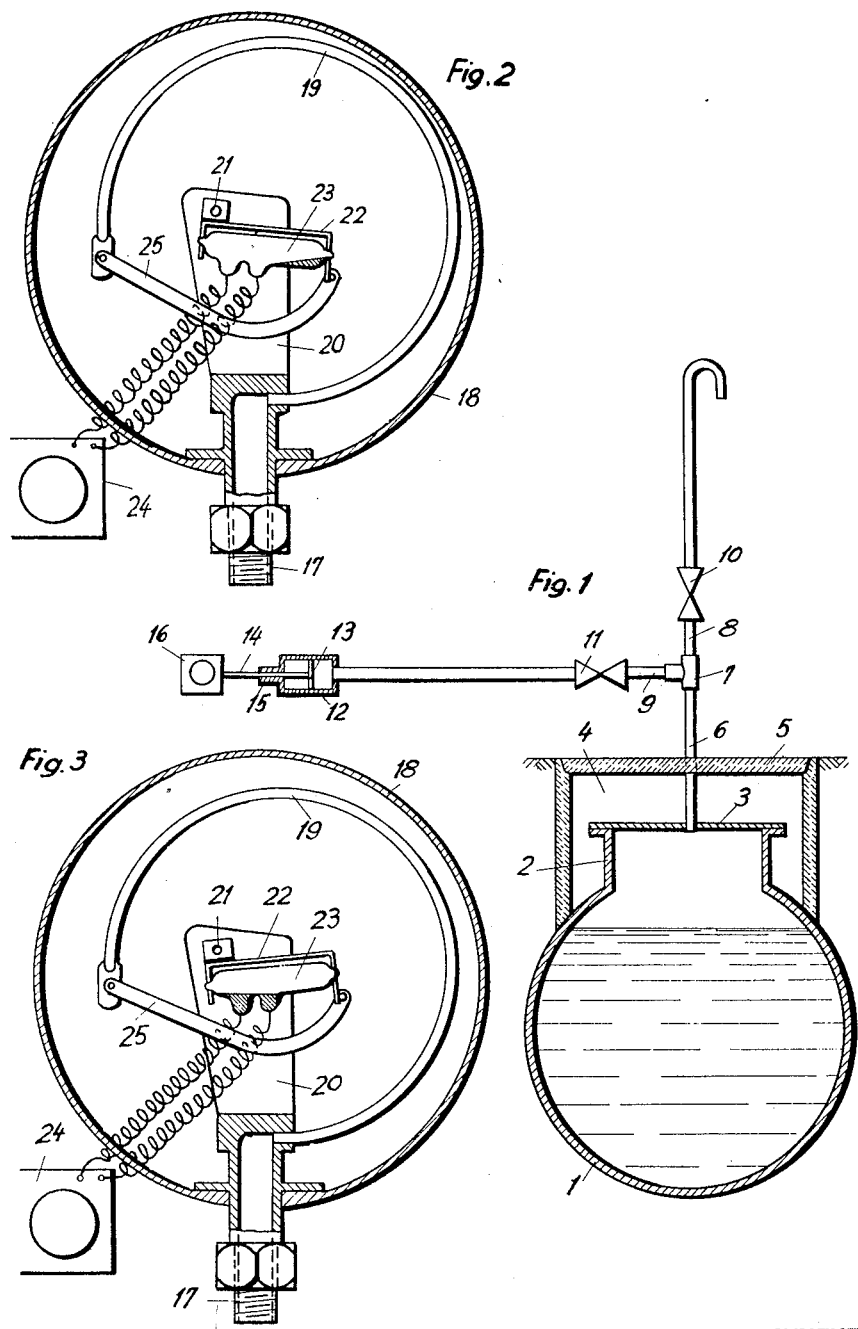

AUTOMATIC SIGNALLING AND WARNING DEVICE FOR LIQUID-TANKS

Filed Jan. 9, 1953        3 Sheets-Sheet 2

INVENTOR.
KARL BOSSARD
BY

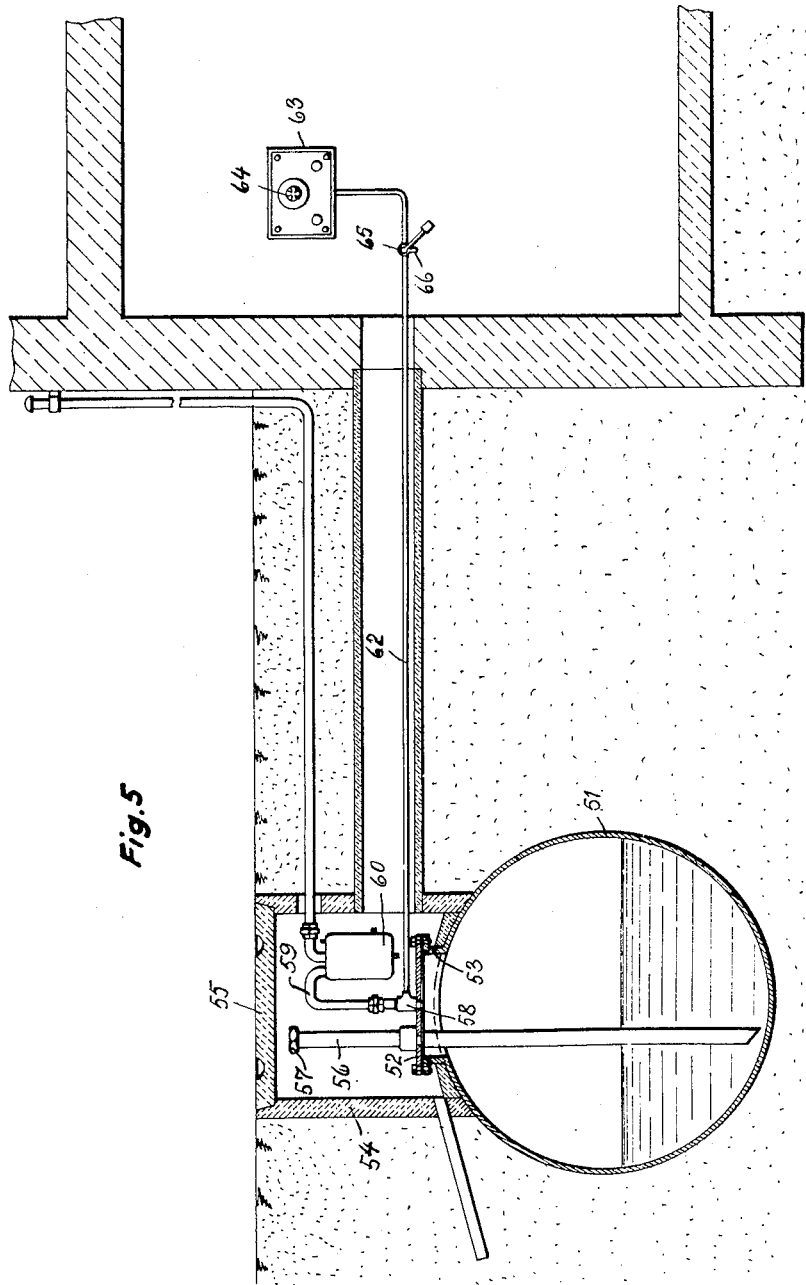

United States Patent Office 2,717,989
Patented Sept. 13, 1955

2,717,989

AUTOMATIC SIGNALLING AND WARNING DEVICE FOR LIQUID-TANKS

Karl Bossard, Zurich, Switzerland

Application January 9, 1953, Serial No. 330,456

Claims priority, application Switzerland February 6, 1952

9 Claims. (Cl. 340—236)

The invention relates to an automatic signalling and warning device for liquid-tanks for the indication of leakage thereof, comprising a control member which is responsive to the pressure prevailing in the space above the liquid in the tank containing the same, and an electrical signalling device which is put in and out of action by the said control member, the arrangement of the control member and of the signalling device being such that the signalling device is put in action, when the pressure acting on the control member drops below a predetermined value.

When a leak is sprung on the liquid-tank through which liquid escapes, the liquid level in the liquid-tank drops and this has the consequence that over the liquid contained in the liquid-tank a depression is established, which influences the control member in the sense that the same puts the electrical signalling device into action.

The electrical signalling device may operate acoustically and may for example consist of an alarm bell, siren or the like, or it may operate optically and consist of signal lamps arranged on a suitable point; if desired a combined signalling device may be provided which operates at the same time both acoustically and optically.

In the drawing two embodiments of the invention are illustrated diagrammatically by way of example, as well as special modifications and details thereof:

Fig. 1 is a vertical section of a liquid-tank arranged below floor level comprising a first embodiment of the automatic signalling-and warning device for the indication of leakage thereof.

Fig. 2 is a cross section on a larger scale of a first modification of the control member and electrical switch for the signalling device in the position in which the signalling device is out of action.

Fig. 3 shows the control member of Fig. 2 in the position in which the signalling device is put in operation.

Fig. 5 is a vertical section of a liquid-tank arranged below floor level comprising the said second modification of the automatic signalling-and warning device for the indication of leakage thereof.

Figure 4:
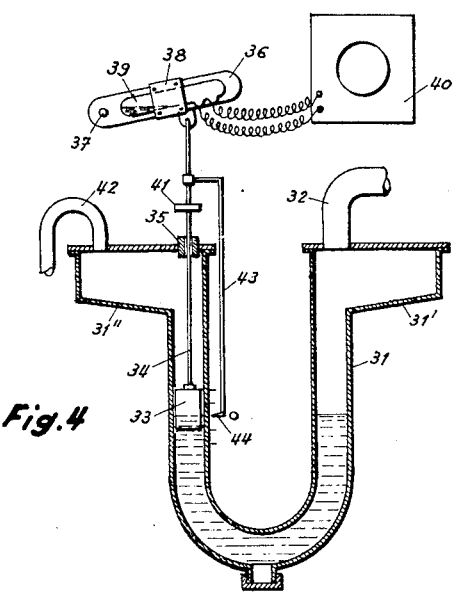
Fig. 4 shows on a larger scale a second modification of the control member with electrical switch for the signalling device of the automatic signalling-and warning device.

Referring first to Fig. 1, the liquid tank 1, for example a fuel oil tank, is arranged below floor level and has on top an extension 2 which is tightly closed by a cover 3. The extension is situated in a pit 4 which is covered by a lid 5. In the cover 3 a pipe 6 is inserted which penetrates the lid 5 of the pit 4 and on which, above the lid 5, a T-piece 7 is arranged to which on the one hand a vent pipe 8 and on the other hand a pipe 9 are connected. In the vent pipe 8 a non-return valve 10 is arranged which opens in response to excess pressure prevailing in the extension 2, and allows air to escape through the pipe 6 and the vent pipe 8. In the pipe 9 a non-return valve 11 is provided which is so arranged that it closes when in the extension 2 a normal pressure or an excess pressure prevails, but opens in response to a depression prevailing in the extension 2. The pipe 9 leads to a closed cylindrical container 12 wherein a diaphragm 13 is arranged which divides the space in this container 12. To the middle of the diaphragm 13, on the side facing away from the orifice of the pipe 9, the end of a control rod 14 is attached, which is guided in a guide 15 on the bottom of the container 12 opposite the pipe 9, and which operates an electric signalling device 16.

When in the under-floor liquid-tank 1, and accordingly in the extension 2 thereof, an excess pressure occurs, the non-return valve 10 opens and allows air to escape through the pipe 6 and the vent pipe 8, until equilisation of pressure is established, whereupon the non-return valve 10 closes again. The non-return valve 11 remains closed in this phase. When however, liquid escapes from the under-floor liquid-tank 1 owing to a leak, a depression is set up in the extension 2 which causes the non-return valve 11 to open and a depression to be set up also in the part of the container 12 which is connected to the pipe 9. This depression in the said part of the container 12 has the consequence that the diaphragm 13 caves in, which has the effect of shifting the control rod 14 attached to it and accordingly of operating the signalling device 16. Upon consumption of the liquid in normal operation, actuating of the signalling device 16 is, however, prevented in that a special pressure equalizing pipe (not shown in the drawing) is opened simultaneously with switching on the liquid consumption, e. g. of an oil heater, or of an internal combustion engine, which equalizing pipe is closed again when the liquid consumption is switched off.

Since in the extension 2 of a liquid-tank 1 arranged under floor level or in spaces of at least approximately constant temperature a rise in pressure occurs only when filling the said tank, alternatively, instead of the T-piece 7, a two-way cock may be provided, which when filling the liquid-tank 1 is so adjusted that it connects the pipe 6 with the vent pipe 8, and which, after the filling of the liquid-tank 1 is terminated, is so switched over that it connects the pipe 6 to the pipe 9. In this case the provision of the non-return valves 10 and 11 can be dispensed with.

Instead of the container 12 with diaphragm 13 and control rod 14, alternatively an electrical switching device according to Figs. 2 and 3 can be provided. This switching device comprises a tube socket 17 adapted to be connected to the pipe 6, on which socket a casing 18 is mounted. In the casing 18 an arched tubular spring 19 is arranged, one end of which is connected to the socket 17 and the other end of which is closed. In the casing 18, on the tube socket a bracket 20 is mounted, on which a cradle 22 carrying a mercury switch 23 is journalled on an axle 21, by means of which switch an electrical signalling device 24 can be switched on and off. On the free, closed, end of the tubular spring 19, one end of a link 25 is attached, the other end of which is articulated to the cradle 22.

When in the pipe 6 there prevails a normal, i. e. atmospheric pressure, the tubular spring has the shape as illustrated in Fig. 2, and the cradle 22 with the mercury switch 23 is kept by the link 25 in such a position, that it interrupts the circuit of the electrical signalling device 24. When, however, owing to loss of liquid from the liquid-tank a depression is set up in the pipe 6, the tubular spring 19 communicating with this pipe 6 is curved more strongly, and by the link 25 the cradle 22 is brought into such a position (Fig. 3) that the mercury switch 23 attached to it closes the circuit of the signalling device 24 and puts the same into action.

In the modified embodiment of the control member according to Fig. 4, a U-shaped tube is denoted 31, the legs of which have on their upper ends enlargements 31' and 31", respectively, and which tube contains a liquid in its lower portion.

The leg of the tube 31 having the enlargement 31' is sealed in an air-tight manner, and in the cover of the enlargement 31' a pipe 32 is inserted which is in communication with the space existing in the liquid-tank above the liquid contained therein, which tank is also sealed in an air-tight manner. In the other leg of the tube 31 a float 33 is arranged on which one end of a float rod 34 is attached, which rod is guided in a guide 35 in the cover of the enlargement 31". The upper end of the float rod 34 is articualted to a lever 36 which is pivoted on an axle 37. On this lever 36 an electrical mercury switch 39 is attached by means of a clip 38 which switch is connected into the circuit of an electrical signalling device 40. On the float rod 34 above the guide 35 a stop 41 is arranged which limits the shiftability of the float rod 34 in the downward direction. In the cover of the enlargement 31" a vent pipe 42 is provided.

When in the liquid-tank atmospheric pressure prevails the liquid columns in both legs of the U-shaped tube 31 are at equal level. The float 33 is then in such a position that the float rod 34 holds the lever 36 in such a position that the mercury switch 39 attached thereon interrupts the circuit of the signalling device 40. When in the liquid-tank an increase of pressure occurs, the liquid contained in that leg of the U-shaped tube 31 which is in communication with the liquid-tank is displaced, and the float 33 in the other leg of this tube 31 is raised. The enlargement 31" offers sufficient space to the liquid to prevent it from overflowing. The signalling device 40 is then not operated. When, however, the pressure in the liquid-tank drops owing to loss of liquid, the liquid contained in the U-shaped tube 31 is sucked-up in the leg of this tube 31 which communicates with the liquid-tank, and in the other leg of this tube the liquid level drops which has the consequence that the float 33, too, descends and thereby tilts the lever 35 by the float rod 34 into such a position, that the mercury switch 39 attached on the same closes the circuit of the signalling device 40, and sets this signalling device in action. The enlargement 31' then offers sufficient space to the liquid contained in the tube 31 to prevent any sucking-off of the liquid through the tube 32. The stop 41 prevents the float 33 from sinking down into the bend of the tube 31 which might involve jamming of the float 33.

On the float rod 34 a rod 43 with a pointer 44 is attached which indicates on a scale the liquid level in that leg of the U-shaped tube 31 which contains the float 33. This pointer makes it possible, when filling the liquid into the tube 31, to adjust the liquid level so that the float 33 and the float rod 34 attain exactly that level position which is required for the operation of the mercury switch 39.

In Fig. 5, a liquid-tank is denoted 51 which has an extension 53 closed in an air-tight manner by a cover 52 and housed in a pit 54 which is covered by a lid 55. In the cover 52 a filler pipe 56 is inserted which reaches down approximately to the bottom of the liquid tank 51 and the upper end of which is adapted to be closed by a screw plug 57. In the cover there is moreover inserted a socket 58 from which a pipe 59 leads into a safety cylinder 60 as described hereinafter. From the safety cylinder 60 a pipe 61 leads to the open atmosphere. From the socket 58 a pipe 62 is branched off which leads to a control member arranged in an appliance chest 63, the construction of which member corresponds to one of the modifications described hereinabove and which member operates an electrical switch connected into the circuit of an electrical signalling device 64. In front of the appliance chest 63 a switch-over cock 65 is arranged in the pipe 62, which cock is provided with a connector socket 66. In the operative position this switch-over cock 65 is in such a position that it tightly closes the connector socket 66, and that it connects that part of the pipe 62, which leads to the socket 58, to that part of the pipe 62, which leads to the appliance chest 63 and to the control member 63, respectively. For the control of the control member and of the signalling device 64 the switch-over cock 65 can be so re-adjusted that it tightly closes that part of the tube 62, which leads to the socket 58, and connects that part of the tube 62, which leads to the appliance chest 63 and control member, respectively, to the connector socket 66. To the connector socket 66 a suction tube with a testing instrument can be connected, by means of which the control member and the signalling device can be tested.

Figure 6:
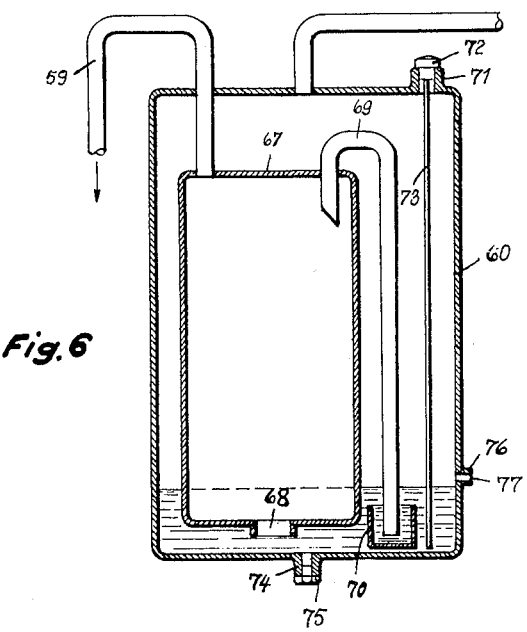
Fig. 6 is a vertical section through the safety cylinder of the signalling-and warning device according to Fig. 5.

The safety cylinder 60 (Fig. 6) contains in its lower portion a non-volatile liquid into which dips a container 67 closed on top and having an entrance opening 68 on the bottom. The pipe 59 is passed through the cover of the safety cylinder 60 and connected to the top of the container 67. In the cover of the container 67 moreover a tube 69 is inserted which extends into the air space in the container 67 and has an end which is cut off obliquely. This tube 69 is led outside the container 67 in the safety cylinder 60 downward into the liquid contained therein where its end is located in a beaker 70 open on top. In the cover of the safety cylinder 60 a filler socket 71 is arranged, which is adapted to be closed by a screw plug 72 which is provided with a dip stick 73 for checking the liquid level in the safety cylinder 60. In the bottom of the safety cylinder a drain socket 74 is provided which is adapted to be closed by a screw plug 75. Moreover on the side wall of the safety cylinder 60 an overflow socket 76 is provided which is adapted to be closed by a screw plug 77.

Through the filler socket 71, when opened, liquid is filled into the safety cylinder 60 until liquid emerges from the overflow socket 76, the latter being kept open. Then the overflow socket is tightly closed by means of the screw plug 77, and the filler socket by means of the screw plug 72. The liquid now stands in the safety cylinder at such a level that the container 67 dips into the same, and that the upper edge of the beaker 71 lies below the liquid level. The liquid contained in the safety cylinder 60 accordingly closes the tube 59 leading to the liquid-tank 51 in an air-tight manner, and accordingly prevents also any evaporation of the liquid contained in the liquid-tank 57. When the liquid-tank 51 is being filled, the air contained therein is expelled through the socket 58 and the pipe 59, and gets into the container 67. This air displaces the liquid sealing the container 67 from below, and flows into the safety cylinder 60 from which it can escape through the tube 61. When, however, a depression occurs in the liquid tank 51 owing to loss of liquid, the said depression acts through the pipe 62 on the control member which, in turn, operates the switch of the electrical signalling device 64 and puts the same into action.

At the same time, the liquid contained in the safety cylinder 60 is sucked into the container 67 communicating with the liquid-tank 51. This, however, is possible only until the liquid level in the safety cylinder 60 outside the container 67 has dropped below the upper edge of the beaker 70, since thereafter this beaker is emptied through the tube 69, and an equalization of pressure between the interior of the safety cylinder 60 and the interior of the container 67 is effected by this tube 69, so that the liquid level in the container 67 drops again to its former level, whereupon the cycle is repeated as long as the depression in the liquid-tank 51 persists. It is accordingly impossible that liquid is sucked off from the safety cylinder 60 when a depression occurs in the liquid tank.

In order to prevent the electrical signalling device 64 from being constantly operated when the liquid level drops in the liquid-tank 51 owing to the operation of a consumer, e. g. of a heating plant or of an internal combustion engine, the signalling device 64 may be switched off during the operation of this consumer by adjusting the switch-over cock 65 accordingly.

While I have described and illustrated what may be considered typical and particularly useful embodiments of my said invention, I wish it to be understood that I do not limit myself to the particular details and dimensions shown and described, for obvious modifications will occur to a person skilled in the art.

What I claim as my invention and desire to secure by Letters Patent, is:

1. A container device and leakage signal arrangement therefor comprising, in combination, container means adapted to contain a liquid; control means connected to said container means and responsive to the pressure in the space in said container means above the liquid adapted to be contained therein; signal means associated with said control means and operable thereby when the pressure in said space in said container means drops below a predetermined amount; inlet means communicating with the interior of said container means for delivering liquid thereto; vent means communicating with said space in said container means; and automatic sealing means associated with said vent means for closing the same while allowing displacement of air through said vent means from said container means during filling of the latter with liquid.

2. A container device and leakage signal arrangement therefor comprising, in combination, container means adapted to contain a liquid; control means connected to said container means and responsive to the pressure in the space in said container means above the liquid adapted to be contained therein; signal means associated with said control means and operable thereby when the pressure in said space in said container means drops below a predetermined amount; inlet means communicating with the interior of said container means for delivering liquid thereto; vent means communicating with said space in said container means; and automatic sealing means associated with said vent means for closing the same while allowing displacement of air through said vent means from said container means during filling of the latter with liquid, said automatic sealing means including vessel means and a sealing liquid contained therein for closing said vent means, and including means for retaining said sealing liquid in said vessel means when the pressure in said space in said container means decreases.

3. A container device and leakage signal arrangement therefor comprising, in combination, container means adapted to contain a liquid; control means connected to said container means and responsive to the pressure in the space in said container means above the liquid adapted to be contained therein; signal means associated with said control means and operable thereby when the pressure in said space in said container means drops below a predetermined amount; inlet means communicating with the interior of said container means for delivering liquid thereto; vent means communicating with said space in said container means; and automatic sealing means associated with said vent means for closing the same while allowing displacement of air through said vent means from said container means during filling of the latter with liquid, said automatic sealing means including an outer vessel communicating with the atmosphere through said vent means, an inner vessel within said outer vessel and connected to said container means by said vent means, said inner vessel having an opening at its bottom communicating with said outer vessel, a sealing liquid in the lower portions of both said inner and outer vessels adapted to freely flow therebetween through said opening, an auxiliary vessel in the lower portion of said outer vessel normally containing sealing liquid, and a conduit connecting the interior of said auxiliary vessel with the upper portion of said inner vessel.

4. A container device and leakage signal arrangement therefor comprising, in combination, container means adapted to contain a liquid; control means connected to said container means and responsive to the pressure in the space in said container means above the liquid adapted to be contained therein; signal means associated with said control means and operable thereby when the pressure in said space in said container means drops below a predetermined amount; inlet means communicating with the interior of said container means for delivering liquid thereto; vent means communicating with said space in said container means; and automatic sealing means comprising check valve means associated with said vent means for closing the same while allowing displacement of air through said vent means from said container means during filling of the latter with liquid.

5. A cointainer device and leakage signal arrangement therefor comprising, in combination, container means adapted to contain a liquid; conduit means communicating with said container means; control means connected by said conduit means to said container means and responsive to the pressure in the space in said container means above the liquid adapted to be contained therein; signal means associated with said control means and operable thereby when the pressure in said space in said container means drops below a predetermined amount; first check valve means normally closing said conduit means between said container means and said control means and opening in response to a drop in pressure in said space in said container means; inlet means communicating with the interior of said container means for delivering liquid thereto; vent means communicating with said space in said container means; and automatic sealing means comprising second check valve means associated with said vent means for closing the same while allowing displacement of air through said vent means from said container means during filling of the latter with liquid.

6. A container device and leakage signal arrangement therefor comprising, in combination, container means adapted to contain a liquid; control means connected to said container means and responsive to the pressure in the space in said container means above the liquid adapted to be contained therein, said control means comprising a housing and a diaphragm in said housing defining a chamber therein communicating with said space; signal means connected to said diaphragm of said control means and operable thereby when the pressure in said space in said container means drops below a predetermined amount; inlet means communicating with the interior of said container means for delivering liquid thereto; vent means communicating with said space in said container means; and automatic sealing means associated with said vent means for closing the same while allowing displacement of air through said vent means from said container means during filling of the latter with liquid.

7. A container device and leakage signal arrangement therefor comprising, in combination, container means adapted to contain a liquid; control means connected to said container means and responsive to the pressure in the space in said container means above the liquid adapted to be contained therein, said control means comprising an arcuate tubular spring member communicating with said space and contractible in response to a drop in pressure therein, and a pivotally mounted mercury switch turnable by the contraction of said spring member so as to be actuated thereby; signal means associated with said mercury switch of said control means and operable thereby when the pressure in said space in said container means drops below a predetermined amount; inlet means communicating with the interior of said container means for delivering liquid thereto; vent means communicating with said space in said container means; and automatic sealing means associated with said vent means for closing the same while allowing displacement of air through said vent means from said container means during filling of the latter with liquid.

8. A container device and leakage signal arrangement therefor comprising, in combination, container means adapted to contain a liquid; control means connected to said container means and responsive to the pressure in the space in said container means above the liquid adapted to be contained therein, said control means comprising a U-shaped tubular member having liquid in the bend portion thereof, one leg of said U-shaped member being connected to said space in said container means, float means in said liquid in the other leg of said U-shaped member and adapted to sink therein in response to a drop in pressure in said space, and a pivotally mounted mercury switch turnable by the sinking movement of said float means so as to be actuated thereby; signal means associated with said mercury switch of said control means and operable thereby when the pressure in said space in said container means drops below a predetermined amount; inlet means communicating with the interior of said container means for delivering liquid thereto; vent means communicating with said space in said container means; and automatic sealing means associated with said vent means for closing the same while allowing displacement of air through said vent means from said container means during filling of the latter with liquid.

9. Automatic sealing means for the vent of a container adapted to be filled with liquid, comprising, in combination, an outer vessel communicating at its upper portion with the atmosphere; an inner vessel within said outer vessel and adapted to be connected to the container through the vent thereof, said inner vessel having an opening at its bottom communicating with said outer vessel; a sealing liquid in the lower portions of both said inner and outer vessels adapted to freely flow therebetween through said opening; an auxiliary vessel in the lower portion of said outer vessel normally containing sealing liquid; and a conduit connecting the interior of said auxiliary vessel with the upper portion of said inner vessel.

References Cited in the file of this patent
UNITED STATES PATENTS

| | | |
|---|---|---|
| 1,904,226 | Henneberger | Apr. 18, 1933 |
| 1,940,346 | Edwards | Dec. 19, 1933 |
| 2,050,521 | Chapin | Aug. 11, 1936 |
| 2,058,256 | Pike | Oct. 20, 1936 |
| 2,244,392 | Emanueli | June 3, 1941 |
| 2,520,624 | Davey | Aug. 29, 1950 |